United States Patent
Petrany et al.

(10) Patent No.: US 12,252,870 B2
(45) Date of Patent: Mar. 18, 2025

(54) GROUND ENGAGING TOOL WEAR AND LOSS DETECTION SYSTEM AND METHOD

(71) Applicant: Caterpillar Inc., Peoria, IL (US)

(72) Inventors: Peter Joseph Petrany, Dunlap, IL (US); Shastri Ram, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 777 days.

(21) Appl. No.: 17/086,081

(22) Filed: Oct. 30, 2020

(65) Prior Publication Data

US 2022/0136217 A1    May 5, 2022

(51) Int. Cl.
| | |
|---|---|
| *E02F 9/26* | (2006.01) |
| *B60Q 9/00* | (2006.01) |
| *E02F 3/32* | (2006.01) |
| *G06T 7/00* | (2017.01) |
| *G06T 7/11* | (2017.01) |
| *G06T 7/174* | (2017.01) |
| *G06T 7/70* | (2017.01) |
| *G06V 20/40* | (2022.01) |
| *G08B 21/18* | (2006.01) |

(52) U.S. Cl.
CPC ............... *E02F 9/267* (2013.01); *B60Q 9/00* (2013.01); *G06T 7/001* (2013.01); *G06T 7/11* (2017.01); *G06T 7/174* (2017.01); *G06T 7/70* (2017.01); *G06V 20/41* (2022.01); *G08B 21/18* (2013.01); *E02F 3/32* (2013.01); *G06T 2207/10016* (2013.01); *G06T 2207/30164* (2013.01)

(58) Field of Classification Search
CPC .... E02F 9/267; E02F 3/32; G06T 7/11; G06T 7/174; G06T 7/70; G06T 7/001; G06T 2207/10016; G06T 2207/30164; G06V 20/41; B60Q 9/00; G08B 21/18
See application file for complete search history.

(56) References Cited

U.S. PATENT DOCUMENTS

| | | | |
|---|---|---|---|
| 8,411,930 B2 | 4/2013 | Ridley et al. | |
| 9,670,649 B2* | 6/2017 | Bewley | ............... E02F 9/2816 |
| 9,886,754 B2 | 2/2018 | Lim et al. | |
| 10,249,060 B2 | 4/2019 | Wagner et al. | |
| 10,339,667 B2* | 7/2019 | Tafazoli Bilandi | .... G01B 11/04 |
| 10,504,072 B2 | 12/2019 | Restum et al. | |

(Continued)

FOREIGN PATENT DOCUMENTS

| | | |
|---|---|---|
| CN | 106592679 A | 4/2017 |
| CN | 107862675 A | 3/2018 |

(Continued)

*Primary Examiner* — Jess Whittington
*Assistant Examiner* — Terry C Buse

(57) ABSTRACT

A wear detection system can be configured to receive a video stream including a plurality of images of a bucket of the work machine from a camera associated with the work machine. The bucket has one or more ground engaging tools (GET). The wear detection system can also be configured to identify a plurality of tool images from the video stream over a period of time. The plurality of tool images depict the GET at a plurality of instances over a period of time. The wear detection system can also be configured to determine a plurality of tool pixel counts from the plurality of tool image and determine a wear level for the GET based on the plurality of tool pixel counts.

20 Claims, 9 Drawing Sheets

(56) References Cited

U.S. PATENT DOCUMENTS

| | | | |
|---|---|---|---|
| 10,689,833 B2 | 6/2020 | Bewley | |
| 10,929,820 B2 | 2/2021 | Restum et al. | |
| 2010/0142759 A1* | 6/2010 | Ridley | E02F 9/2808 |
| | | | 382/107 |
| 2015/0085123 A1* | 3/2015 | Tafazoli Bilandi | G01S 17/06 |
| | | | 348/148 |
| 2016/0237640 A1 | 8/2016 | Carpenter et al. | |
| 2016/0364683 A1* | 12/2016 | Lyons | G06Q 30/018 |
| 2017/0051474 A1 | 2/2017 | Finch et al. | |
| 2017/0103506 A1 | 4/2017 | Dandibhotla et al. | |
| 2017/0287124 A1* | 10/2017 | Lim | G06T 7/74 |
| 2017/0352199 A1 | 12/2017 | Finley et al. | |
| 2018/0038083 A1* | 2/2018 | Reyes-Rodriguez | E02F 9/267 |
| 2018/0106019 A1 | 4/2018 | Bewley et al. | |
| 2020/0362539 A1 | 11/2020 | Plouzek et al. | |
| 2020/0363203 A1 | 11/2020 | Plouzek et al. | |
| 2020/0393303 A1 | 12/2020 | Betournay et al. | |
| 2021/0042907 A1 | 2/2021 | Campomanes et al. | |
| 2021/0174486 A1* | 6/2021 | Chowhan | G06F 18/25 |
| 2021/0356932 A1* | 11/2021 | Kono | G05B 19/25 |

FOREIGN PATENT DOCUMENTS

| | | |
|---|---|---|
| JP | 2015190770 | 11/2015 |
| JP | 2020105902 | 7/2020 |
| RU | 2681173 | 3/2019 |
| RU | 2713684 | 2/2020 |
| SU | 1602947 | 10/1990 |
| WO | WO2019/227194 A1 | 12/2019 |
| WO | WO20200237324 A1 | 12/2020 |
| WO | WO20210041988 A1 | 3/2021 |

* cited by examiner

GROUND ENGAGING TOOL WEAR AND LOSS DETECTION SYSTEM AND METHOD

TECHNICAL FIELD

The present disclosure relates to a system and method for detecting wear of objects over time, and more particularly, to a system and method for detecting wear in, or loss of, ground engaging tools (GET) over time using computer vision techniques.

BACKGROUND

Machines may be used to perform variety of tasks at a worksite. For example, machines may be used to excavate, move, shape, contour, and/or remove material present at the worksite, such as gravel, concrete, asphalt, soil, and/or other materials. These machines can include a bucket used to collect such materials, and the bucket can include a set of ground engaging tools (GET), such as teeth, to loosen the material. Over time, the GET wear and diminish in size reducing their effectiveness making it more difficult for the bucket to collect worksite material. GET can also break from the bucket. When a GET break goes undetected, the GET can mix with the worksite material and can cause damage to downstream processing equipment such as crushers or pulverizers. Work machines may utilize wear detection systems to identify worn or broken GET before damage to downstream equipment occurs.

An attempt to provide a wear detection system is described in U.S. Pat. No. 10,339,667 B2 ("the '667 Patent"), issued on Jul. 2, 2019. Specifically, the '667 Patent describes a method for determining the condition of a wear part in an image of an operating implement associated with heavy equipment. According to the '667 Patent, the method involves capturing an image of the operating implement during operation of the heavy equipment. The image includes a plurality of pixels having an intensity value. The '667 Patent also describes that successive pixel subsets within the plurality of pixels are selected and each pixel subset is processed to determine whether pixel intensity values in the pixel subset match the wear part. The matching is performed using trained neural networks that capture and classify the images.

The '667 Patent's reliance on neural networks and machine learning for identifying wear can be problematic. Training and using neural networks and machine learning can be computationally expensive, especially when processing a large amount of images captured via video. Moreover, machine learning techniques such as those described in the '667 Patent can be prone to a large amount of false positives rendering them ineffective. The systems and methods described herein may be directed to addressing one or more of these concerns.

SUMMARY

According to a first aspect, a method for detecting wear or loss of ground engaging tools (GET) includes receiving from a camera associated with a work machine, a video stream including a plurality of images of a bucket of the work machine. The bucket includes at least one GET. The method also includes identifying a plurality of tool images from the video stream over a period of time. The plurality of tool images depict the at least one GET at a plurality of time instances. The method also includes determining a plurality of tool pixel counts from the plurality of tool images and determining a wear level or loss for the at least one GET based on the plurality of tool pixel counts.

According to a further aspect, a GET wear detection system includes a camera, a processor, and a non-transitory computer readable medium storing executable instructions. The executable instructions when executed by the processor cause the processor to perform operations including receiving, from the camera, a video stream including a plurality of images of a bucket having at least one GET. The operations also include identifying a plurality of tool images from the video stream, the plurality of tool images depicting the at least one GET at a plurality of time instances over a period of time. The operations also include determining a plurality of tool pixel counts from the plurality of tool images and determining a wear level or loss for the at least one GET based on the plurality of tool pixel counts.

According to another aspect, a GET wear detection system includes a camera configured to capture a video stream of a bucket having a plurality of GET during a moment in a dig-dump cycle of a work machine when the plurality of GET are within a field of view of the camera. The system also includes a processor and a computer readable medium storing executable instructions that when executed by the processor cause the processor to perform operations. The operations include receiving the video stream from the camera. The video stream includes a plurality of images of the bucket. The operations further include identifying a plurality of tool images from the video stream, the plurality of tool images depicting, at a plurality of time instances over a period of time, a GET of the plurality of GET. The operations further include determining a plurality of tool pixel counts associated with the GET from the plurality of tool images and determining a wear level or loss for the GET based on mapping the plurality of time instances to the plurality of tool pixel counts.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

The present disclosure is generally directed to systems and methods for detecting wear of components of a work machine in an environment, such as a worksite, using computer vision techniques. In some examples, a camera associated with a work machine captures video of a component of the work machine. The video is analyzed by a processor associated with the work machine to detect wear of the component. The component may be one or more ground engaging tools (GET) of a bucket of the work machine. In some examples, the system and method select images from the video captured by the camera for processing using a template images illustrating both the bucket and the GET.

For images selected for processing, the system and method determine the number of pixels for the GET and create a graph or mapping of pixel counts for the GET over time. Pixel counts can include area (e.g., total pixel for the GET), height of the GET in pixels, width of the GET in pixels, the sum of height and width of the GET, as just some examples. The manner of determining pixel counts can vary depending on the shape and style of the GET. For example, for GET that are much longer than they are wide, height pixel counts may be used, whereas for GET that are much wider than they are long, width pixel counts may be used. Various methods for determining pixel counts may be used without departing from the spirit and scope of the present disclosure.

In some examples, the processor can determine wear of the GET—and predict when GET need replacement—based on the rate of change of the GET pixel counts over time. The processor can also determine whether one of the GET has broken (e.g., GET loss) based on when the rate of change of the GET pixel counts over time is high. By using the rate of change of GET pixel counts over time to make such determinations, the system and method can reduce errors in wear detection by minimizing the impact of false positives and can do so with less processing resources than more error prone techniques, such as machine learning or neural networks.

Figure 1:
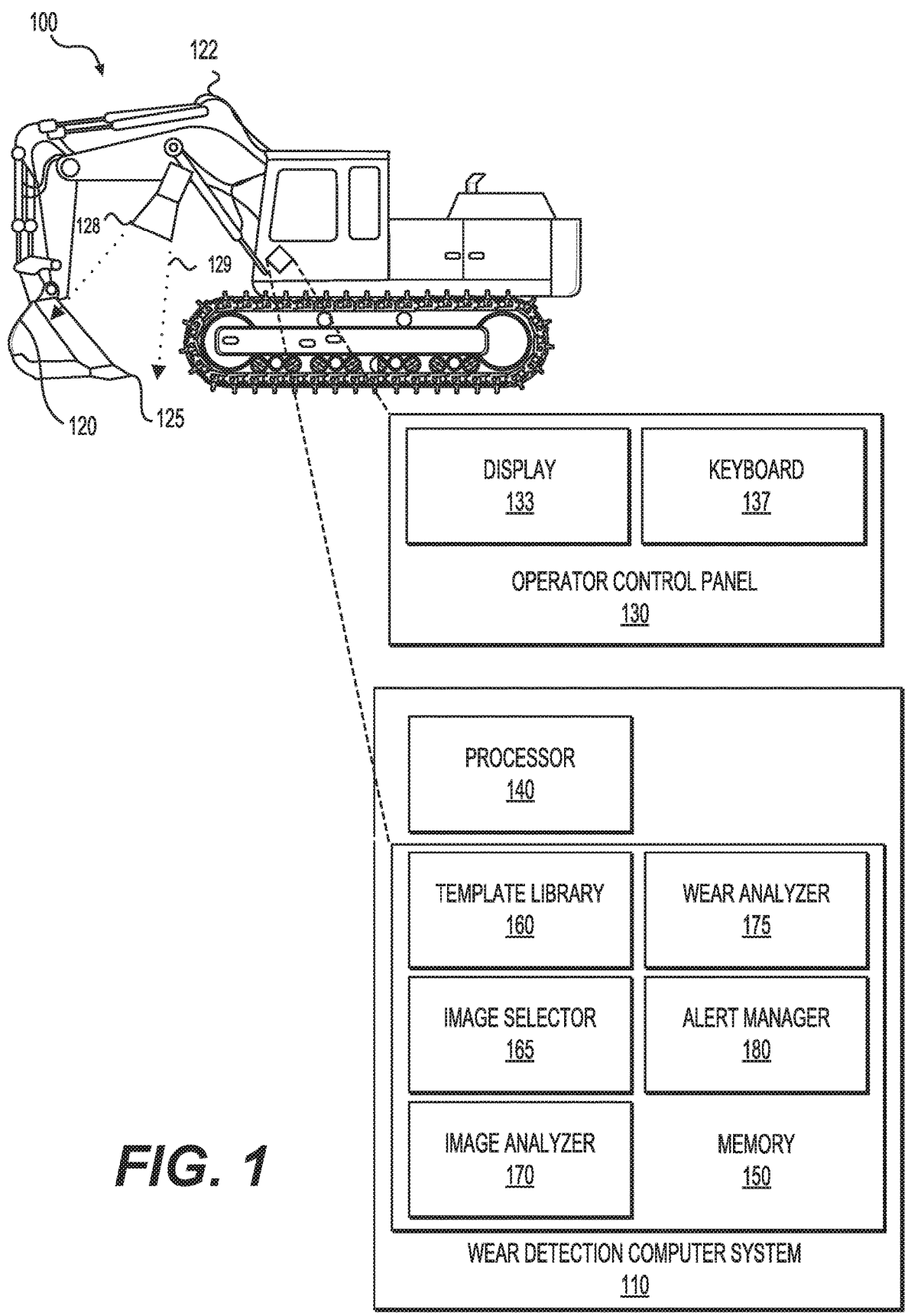
FIG. 1 is a block diagram depicting a schematic view of an example machine including an example system for detecting wear in GET.

FIG. 1 is a block diagram depicting a schematic of an example work machine 100 including an example a wear detection computer system 110. While FIG. 1 depicts work machine 100 as a hydraulic mining shovel, in other examples, work machine 100 can include any machine that moves, sculpts, digs, or removes material such as soil, rock, or minerals. As shown in FIG. 1, work machine 100 can include a bucket 120 attached to arm 122. Bucket 120 can include one or more ground engaging tools (GET), such as teeth 125, that assist work machine 100 in loosening material. While the examples provided in this disclosure refer to teeth 125 as GET, other types of GET are contemplated to be within the scope of the embodiments provided by this disclosure. For example, GET can include lip shrouds, edge guards, adapters, ripper protectors, cutting edges, sidebar protectors, tips, or any other tool associated with a work machine that may wear over time due to friction with worksite material.

Work machine 100 can also include a camera 128. Camera 128 may have a field-of-view 129 directed to bucket 120 and teeth 125. Camera 128 can be a mono or stereo camera.

As work machine 100 operates within a worksite, it may move arm 122 to position bucket 120 to move or dig material within the worksite as part of a dig-dump cycle. As work machine 100 positions bucket 120 through the dig-dump cycle, bucket 120 may move in and out of field-of-view 129 of camera 128. Camera 128 may be positioned so that it has an unobstructed view of teeth 125 during the dig-dump cycle. For example, camera 128 may be positioned on work machine 100 so that bucket 120 and teeth 125 are visible at the moment bucket 120 empties material within the dig-dump cycle. As another example, camera 128 may be positioned so that bucket 120 enters its field-of-view when arm 122 is fully extended or fully contracted within the dig-dump cycle. As explained below with respect to FIGS. 2-4, the position of camera 128 may vary depending on the type of work machine 100 and specifics related to its worksite.

According to some embodiments, work machine 100 can include an operator control panel 130. Operator control panel 130 can include a display 133 which produces output for an operator of work machine 100 so that the operator can receive status or alarms related to wear detection computer system 110. Display 133 can include a liquid crystal display (LCD), a light emitting diode display (LED), cathode ray tube (CRT) display, or other type of display known in the art. In some examples, display 133 can include audio output such as speakers or ports for headphones or peripheral speakers. Display 133 can also include audio input devices such as microphone or ports for peripheral microphones. Display 133 can include a touch-sensitive display screen in some embodiments, which can also act as an input device.

In some embodiments, operator control panel 130 can also include a keyboard 137. Keyboard 137 can provide input capability to wear detection computer system 110. Keyboard 137 can include a plurality of keys allowing the operator of work machine 100 to provide input to wear detection computer system 110. For example, an operator may depress the keys of keyboard 137 to select image templates associated with work machine 100, bucket 120, or teeth 125 according to examples of the present disclosure. Keyboard 127 can be non-virtual (e.g., containing physically depressible keys) or keyboard 127 can be a virtual keyboard shown on a touch-sensitive embodiment of display 133.

As shown in FIG. 1, wear detection computer system 110 can include a processor 140. Processor 140 can include one or more processors such as a central processing unit (CPU), a graphics processing unit (GPU), a field-programmable gate array (FPGA), some combination of CPU, GPU, or FPGA, or any other type of processing unit. Processor 140 may have numerous arithmetic logic units (ALUs) that perform arithmetic and logical operations, as well as one or more control units (CUs) that extract instructions and stored content from processor cache memory, and then executes the instructions by calling on the ALUs, as necessary, during program execution. Processor 140 may also be responsible for executing drivers and other computer-executable instructions for applications, routines, or processes stored in memory 150, which can be associated with common types of volatile (RAM) and/or nonvolatile (ROM) memory.

In some embodiments, wear detection computer system 110 can include a memory 150. Memory 150 can include system memory, which may be volatile (such as RAM), non-volatile (such as ROM, flash memory, etc.) or some combination of the two. Memory 150 can further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by wear detection computer system 110.

Memory 150 can store data, including computer-executable instructions, for a wear detection computer system 110 as described herein. For example, memory 150 can store one or more components of wear detection computer system 110 such as a template library 160, an image selector 165, an image analyzer 170, a wear analyzer 175, and an alert manager 180. Memory 150 can also store additional components, modules, or other code executable by processor 140 to enable operation of wear detection computer system 110. For example, memory 150 can include code related to input/output functions, software drivers, operating systems, or other components.

Template library 160 can include one or more template images used by image selector 165 to identify and select images from a video feed provided to wear detection computer system 110 by camera 128. For example, template library 160 can include one or more image templates that can be used as part of a segmentation or convolution filter algorithm performed by image selector 165 to find images from the video feed that are substantially similar to the one or more image templates. According to some embodiments, the templates stored in template library 160 include images of a bucket and its teeth (e.g., a bucket-tool template). For example, for work machine 100, one of the templates stored in template library 160 can include an image of bucket 120 with teeth 125 as bucket 120 is expected to be positioned within the field of view of camera 128. In some examples, teeth 125 of the one or more templates are unworn, new, or as they appear before they have engaged with material at a worksite.

Template library 160 can include multiple bucket-tool templates where each bucket-tool template corresponds to a work machine, bucket, tooth, GET, or a combination of these. During operation, an operator may use operator control panel 130 to select a bucket-tool template from template library 160 matching bucket 120 in teeth 125, or work machine 100. For example, if the work machine 100 is a hydraulic mining shovel having a model number "6015B," the operator may use operator control panel 130 to input the model number "6015B," and wear detection computer system 110 may load into memory 150 a template corresponding to a model 6015B hydraulic mining shovel from template library 160. In some examples, a list of templates available in template library 160 can be shown on display 133 upon a power-up or reset operation of wear detection computer system 110, and an operator may select one of the templates from the list for operation depending on the model number of work machine 100, bucket type of bucket 120, or tooth type of teeth 125.

According to some embodiments, image selector 165 can perform one or more operations to choose an image for further wear detection analysis. In some embodiments, image selector 165 uses a bucket-tool template and computer vision techniques to match video frames of the video feed of camera 128 to the template. Image selector 165 can utilize a variety of computer vision techniques, either alone or in combination, for matching the bucket-tool template with video frames of the video feed of camera 128. For example, image selector can use a conventional template-based computer vision approach, approaches using eigenspaces, cross-correlation approaches, image segmentation, edge detection techniques, convolution filters, or other techniques known in the art for identifying objections within images based on a template, mask, or kernel.

In some embodiments, image selector 165 can use other techniques for selecting an image for further wear detection analysis. For example, image selector 165 can be configured to capture an image based on the position of bucket 120 during the dig-dump cycle of work machine 100. In such an example, image selector 165 can select an image when bucket 120 can be expected to be in a fixed position, such as at the beginning or end of the dig-dump cycle or when the bucket is fully retracted or extended. When bucket 120 reaches the fixed position, image selector may capture an image from the video feed of camera 128 and select it for future wear detection processing. Image selector 165 can also be configured to select an image at a point during the dig-dump cycle when bucket 120 and teeth 125 are closest to camera 128, or when camera 128 has a clear or unobstructed view of bucket 120 and teeth 125.

Image selector 165 can also use machine learning or neural network techniques to select images for further wear detection analysis. For example, image selector may include a neural network that has been trained using a corpus of training images showing bucket 120 and teeth 125 in an optimal position with respect to the field-of-view of camera 128 and bucket 120 and teeth 125 in nonoptimal positions with respect to the field-of-view of camera 128. The corpus of training images can also include images of objects from a work site that can potentially trigger false positives such as bucket 120 with one or more of teeth 125 missing, bucket 120 with material stuck to it, buckets or teeth not typically used with work machine 100, as just some examples. Once the neural network has been trained, image selector 165 can use it to process the video feed of camera 128 and select images for further wear detection processing.

According to some embodiments, image selector 165 can use a combination of the above identified techniques for identifying images for further wear detection analysis. For example, image selector 165 may use bucket's 120 position within a range of positions corresponding to field-of view 129 within the dig-dump cycle as a trigger to begin applying the bucket-tool template to the images of the video stream captured by camera 128. In such embodiments, image selector 165 may enter a "standby" mode when bucket 120 is outside the range of position, and a "begin processing" mode when bucket 120 enters the range of position. As another example, image selector 165 may use a range of position of bucket 120 in combination with a trained neural network to select images for further processing in a similar fashion.

Image analyzer 170 can be configured to analyze images selected by image selector 165 to further identify individual teeth 125 within the selected image. In some examples, image analyzer 170 selects individual teeth 125 by using an expected location of teeth 125 within the captured image. For example, if image selector 165 is using a bucket-tool template, the expected position of teeth 125 relative to bucket 120 will be known based on the relative position of the teeth and bucket in the bucket-tool template. Using this information, image analyzer 170 can go to the expected location in selected image and capture a pixel region proximate to the teeth. The pixel region can then be used to further identify the tooth based on computer vision techniques such as application of a convolution filter, segmentation analysis, edge detection, or pixel strength/darkness analysis within the pixel region. In some embodiments, image analyzer 170 may use an individual tooth template to apply to the pixel region to further refine the location of the tooth using computer vision techniques.

Wear analyzer 175 can be configured to analyze tooth images or pixel regions identified by image analyzer 170 for wear. In some embodiments, image analyzer 170 analyzes wear based on the associated bucket-tool template used by image selector 165 to select an image for processing. For example, the associated bucket-tool template can include an image of unworn tools which can be compared to the tooth images identified by image analyzer 170 based on the size of the unworn tooth from the bucket-tool template and the size of tooth images. In some embodiments, a similarity score can be calculated for the tooth images and the corresponding unworn tooth in the bucket-tool template. The similarity score can reflect a measure of how well the tooth images match the corresponding unworn tooth in the bucket-tool template. For example, the similarity score can include use of an intersection of union or Jaccard Index method of detecting similarity. In some embodiments, a dice coefficient or F1 Score method of detecting similarity can be employed to determine the similarity score. The similarity score can also include a value reflecting a percentage of how many pixels of the tooth images overlap with their corresponding unworn tooth in the bucket-tool template. In some embodiments, the similarity score may be scaled or normalized from zero to one hundred.

The similarity score can provide an indication of wear of teeth 125. For example, a low score (e.g., a range of 0 to 20) may indicate that one of teeth 125 has broken or is missing indicating tooth loss. A high score (e.g., a range 80-100) may indicate that a tooth is in good health and needs no replacing. A score in between the low and high scores can provide a wear level for the tooth, with higher scores indicating a longer lead time for tooth replacement than a lower score.

In some embodiments, wear analyzer 175 can count pixels associated with images of teeth 125 over time and use the pixel counts to determine a wear level of teeth 125 and a wear trend of teeth 125. For example, work machine 100 can be operating in its worksite over several days for a job. As work machine 100 moves material during the job, camera 128 provides a video feed of bucket 120 and teeth 125 to wear detection computer system 110, and image analyzer 170 identifies pixel regions having teeth for further analysis. Wear analyzer 175 can map pixel counts associated with the tooth at several instances of time over the period of time of the job. As bucket 120 and teeth 125 engage with material at the worksite, it is expected that teeth 125 will diminish in size due to wear. Accordingly, the pixel counts associated with teeth 125 will likewise go down over time, and the pixel counts over time will reflect a wear trend. A wear level for teeth 125 at a particular point in time can be determined using the wear trend at the particular point in time. The wear level for teeth 125 may indicate that teeth 125 need replacement or it may indicate tooth loss for one or more of teeth 125. In some embodiments, pixel counts associated with teeth 125 can be stored in memory 150 and applied to multiple jobs and multiple worksites, and the wear trend can be applicable to the lifetime of teeth 125. In such embodiments, pixel counts associated with teeth 125 captured by wear analyzer 175 may be reset when bucket 120 or teeth 125 are replaced, and wear analyzer 175 can restart collection of pixel counts for teeth 125 from a zero-time point.

Since wear analyzer 175 determines a wear trend based on pixel counts for teeth 125 measured over time, wear analyzer 175 can also form predictions of when teeth 125 may need replacement. For example, if wear analyzer 175 determines that pixel counts associated with teeth 125 show that teeth 125 lose 1% of life per ten work hours (because the pixel counts decrease by 1% per ten work hours), and teeth 125 have been used for eight hundred work hours, wear analyzer 175 may determine that teeth 125 need to be replaced within 200 hours.

In some embodiments, wear detection computer system 110 can include alert manager 180. Alert manager 180 can be in communication with wear analyzer 175 and may monitor the wear trend and wear level determined by wear analyzer 175. Alert manager 180 can provide messaging alerts to operator control panel 130 based on information determined by wear analyzer 175. For example, when the wear level reaches a wear threshold value, alert manager 180 may generate an alert that is shown on display 133 of operator control panel 130. The threshold value can correspond to values indicating extreme tooth wear or, in some cases, complete tooth loss. The alert may provide an indication to the operator of work machine 100 that one or more teeth 125 need replacement. The wear threshold value can vary from embodiments and may dependent on the type of teeth 125 and the material at the worksite with which teeth 125 engage.

Alert manager 180 can also provide an alert that teeth 125 may need replacement at some point in the future, for example, that teeth 125 may need to be replaced within two weeks. A replacement alert can include information related to wear trend predictions for teeth 125. For example, the replacement alert can include a quantification of the wear trend (e.g., teeth 125 wear 2% per work day), the amount of time the teeth have been in use, or the expected date or time teeth 125 will reach the wear threshold based on usage data.

In some embodiments, alert manager 180 can monitor the wear trend determined by wear analyzer 175 and provide a wear level value to display 133 to inform operator of work machine 100 of the current wear level. For example, if the wear trend indicates that teeth 125 are 60% worn down, based on the wear trend, alert manager 180 may provide an indication that teeth 125 have 40% of their life left before they need to be replaced. The display 133 can also inform an operator that a tooth has broken, indicating tooth loss (e.g., when one or more of teeth 125 have less than 20% life).

Figure 2:
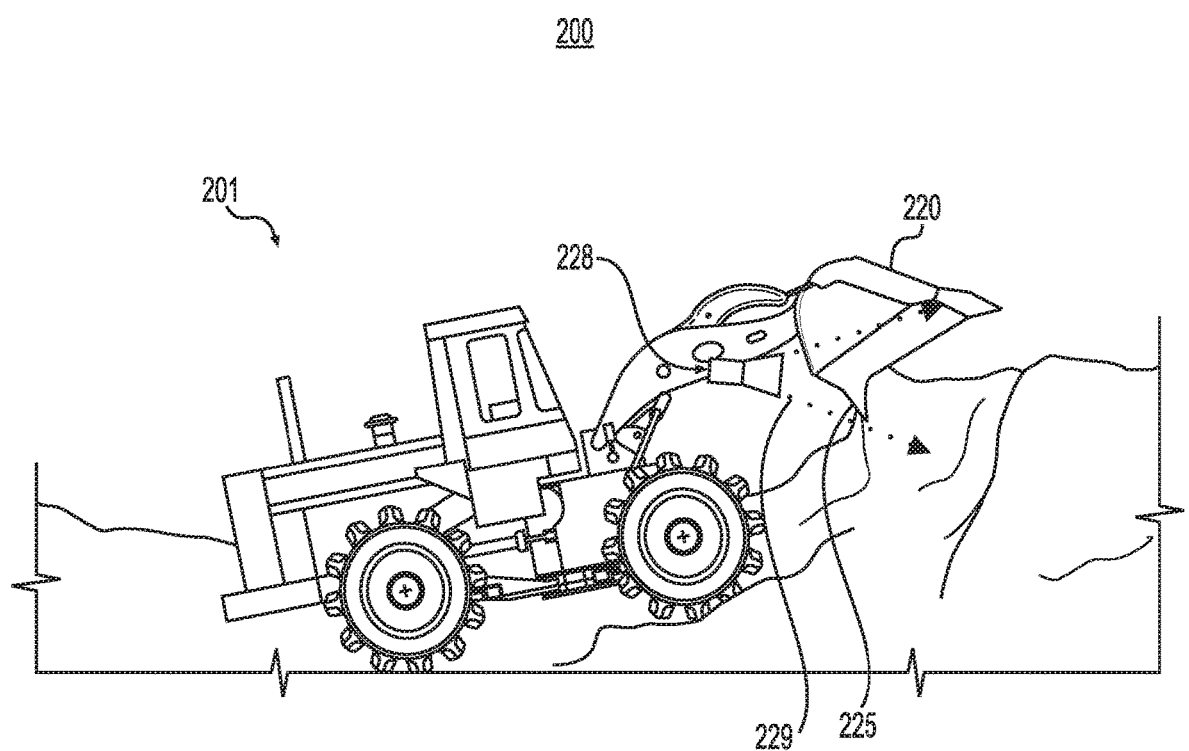
FIG. 2 is a diagram depicting a schematic side view of example environment having an example machine including an example system for detecting wear in GET.

FIG. 2 is a diagram depicting a schematic side view of an example environment 200 in which a wheel loader work machine 201 is operating. Wheel loader work machine 201 can include a bucket 220 and one or more ground engaging teeth 225. As shown in FIG. 2, a camera 228 is positioned so that teeth 225 and bucket 220 are within a field of view 229 of camera 228 during a dump end of the dig-dump cycle. As a result, image selector 165 (FIG. 1) can be configured in such embodiments to capture images when bucket 220 is at rest at the dump end of the dig-dump cycle.

Figure 3:
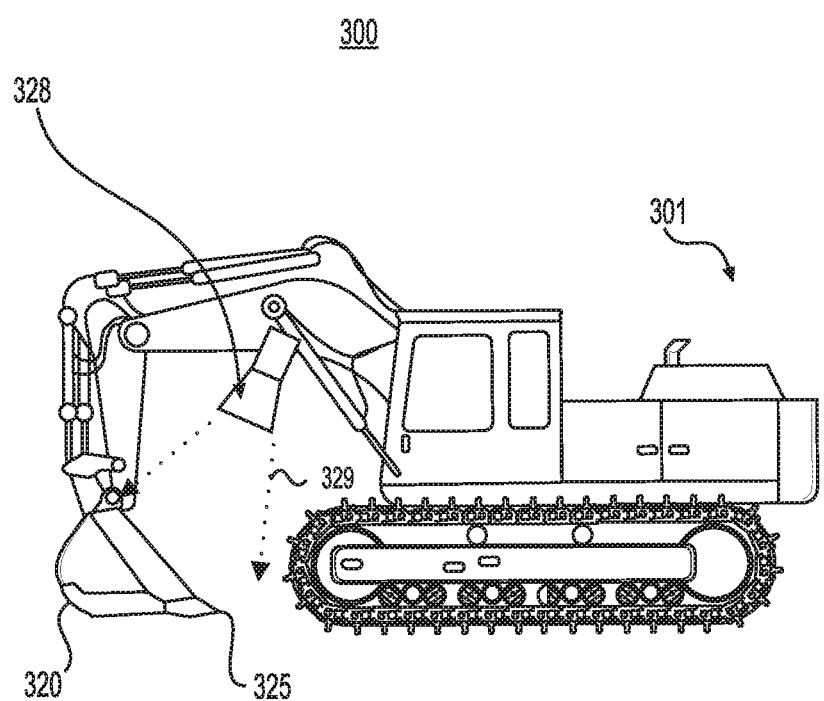
FIG. 3 is a diagram depicting a schematic side view of another example environment having an example machine including an example system for detecting wear in GET.

FIG. 3 is a diagram depicting a schematic side view of an example environment 300 in which a hydraulic mining shovel work machine 301 is operating. Hydraulic mining shovel work machine 301 can include a bucket 320 and one or more ground engaging teeth 325. In contrast to the position of camera 228 for wheel loader work machine 201, camera 328 is positioned such that teeth 325 are within field of view 329 of camera 328 during a dig end of the dig-dump cycle. Image selector 165 (FIG. 1) can be configured in such embodiments to capture images when bucket 320 is at rest at the dig end of the dig-dump cycle.

Figure 4:
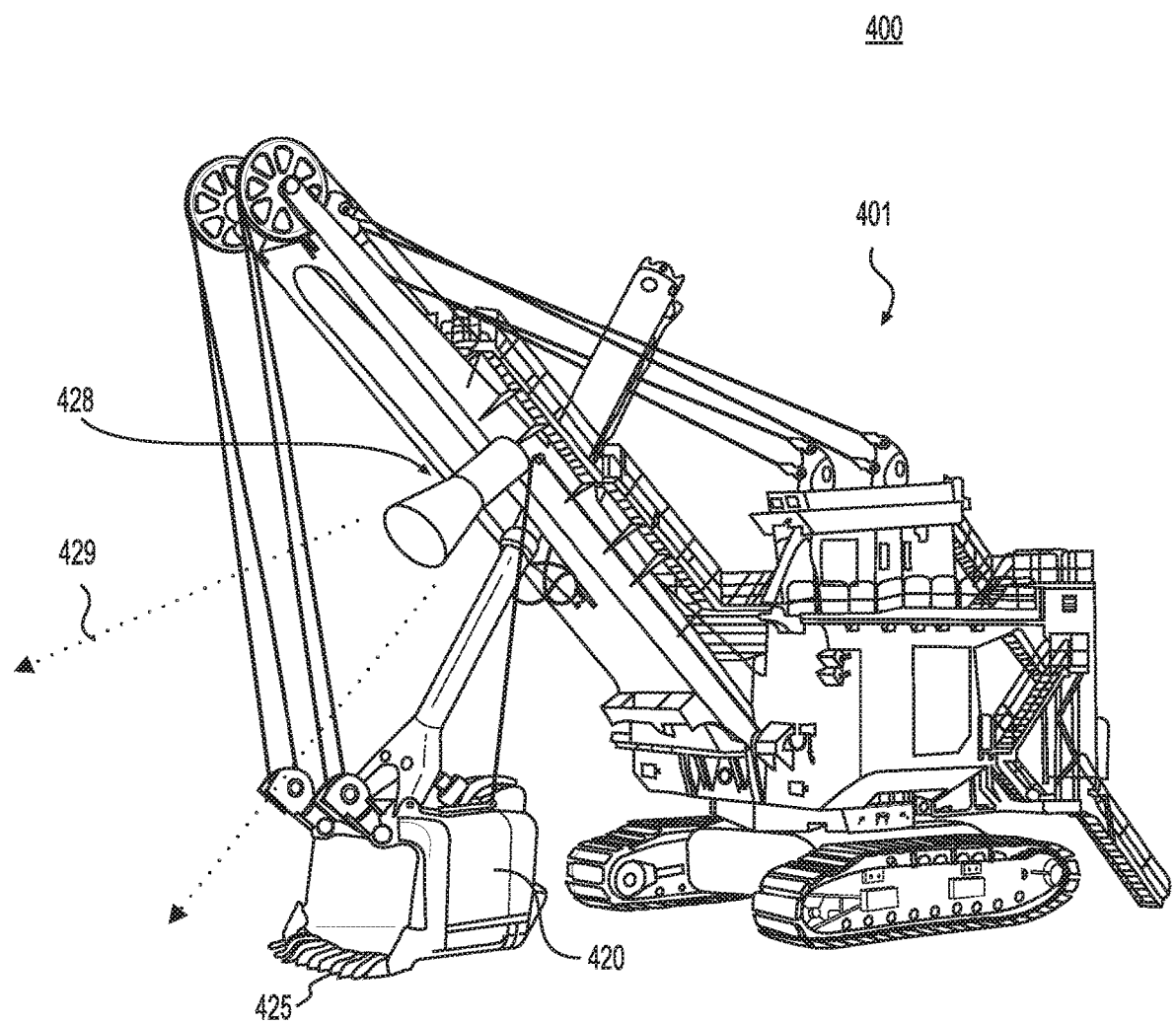
FIG. 4 is a diagram depicting a schematic side view of another example environment having an example machine including an example system for detecting wear in GET

FIG. 4 is a diagram depicting a schematic side view of example an environment 400 in which an electric rope shovel work machine 401 is operating. Electric rope shovel work machine 401 can include a bucket 420, one or more ground engaging teeth 425, and a camera 428. As shown in FIG. 4, teeth 425 may be within a field of view 429 of camera 428 at a midpoint in the dig-dump cycle, but when bucket 420 is relatively close to camera 428. In such embodiments, image selector 165 (FIG. 0.1) can be configured to capture images when bucket 420 enters a range of positions correlating to field of view 429 of camera 428.

Figure 5:
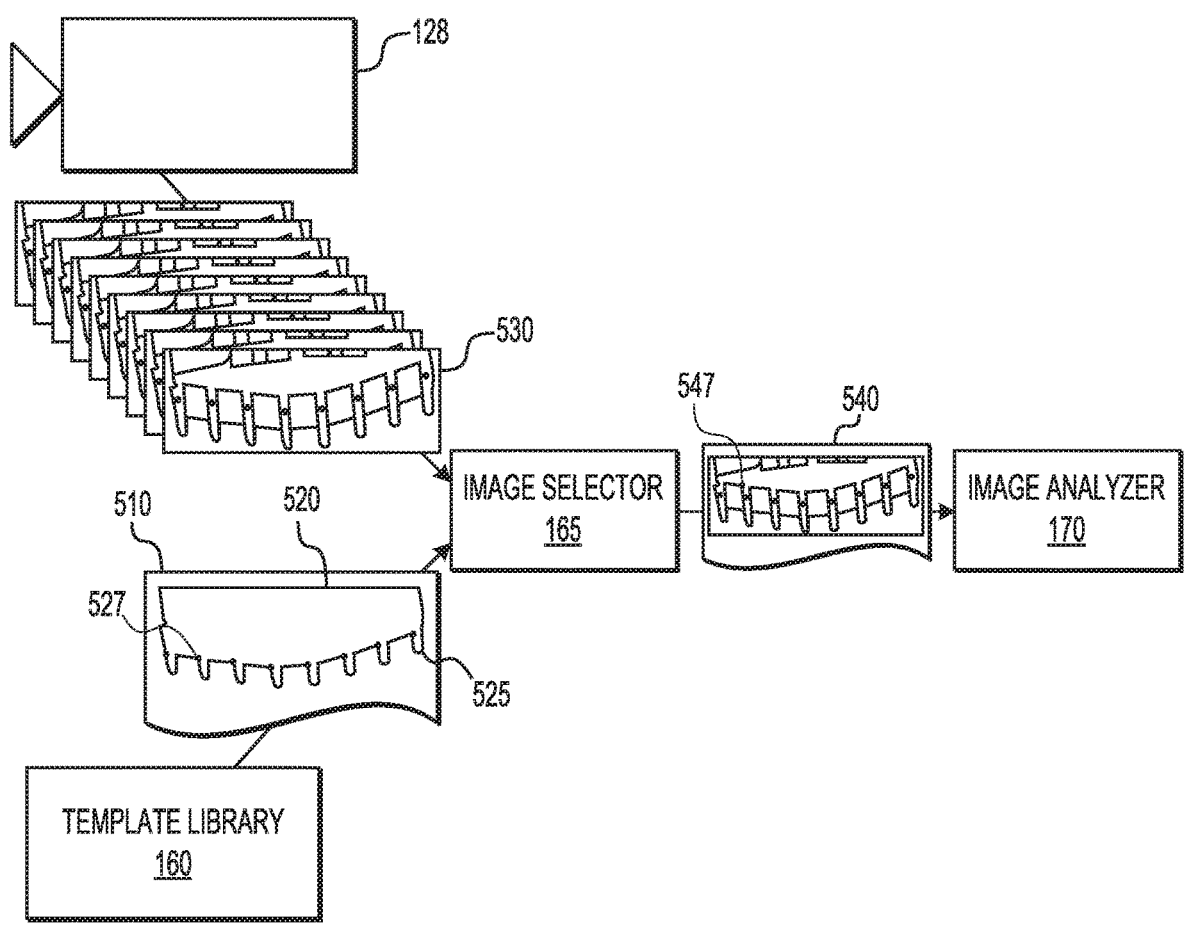
FIG. 5 is a data flow diagram depicting an example flow of data for an image selection process.

FIG. 5 depicts an image selection data flow diagram 500 showing the flow of data for an example image selection process. In some embodiments, template library 160 may provide bucket-tool template 510 to image selector 165. As described above, bucket-tool template 510 may be selected by an operator of work machine 100 before operation. In some embodiments, bucket-tool template 510 is preloaded in software or firmware of wear detection computer system 110. As work machine 100 operates at a worksite, camera 128 can provide a video feed containing a plurality of images 530 to image selector 165. Image selector 165 can analyze the plurality of images using template 510. For example, image selector 165 can use computer vision template matching techniques, convolution filters, segmentation analysis, edge detection, or other computer vision techniques to match template 510 with the plurality of images 530 to identify selected image 540 for further wear detection analysis.

As shown in FIG. 5, template 510 includes an image of both template bucket 520 and template teeth 525. Template bucket 520 can represent an image of bucket 120 in a position and orientation consistent with how bucket 120 appears within the field of view of camera 128. Template teeth 525 can represent new, unworn, or unused versions of teeth 125.

In some embodiments, template 510 includes information providing approximate template tooth locations 527 that image analyzer 170 can use for later identification of individual teeth 125 within selected image 540. Template tooth locations 527 can include pixel offsets from one position of the combined bucket-tool image in template 510. For example, the offset may be the number of pixels down and to the right of the upper leftmost corner of bucket 520. In some embodiments, template tooth locations 527 can be absolute pixel positions for template teeth 525 as opposed to an offset from one edge or corner of bucket 520. Template tooth locations 527 can be used by image analyzer 170 to approximate corresponding image tooth locations 547 within selected image 540.

Figure 6:
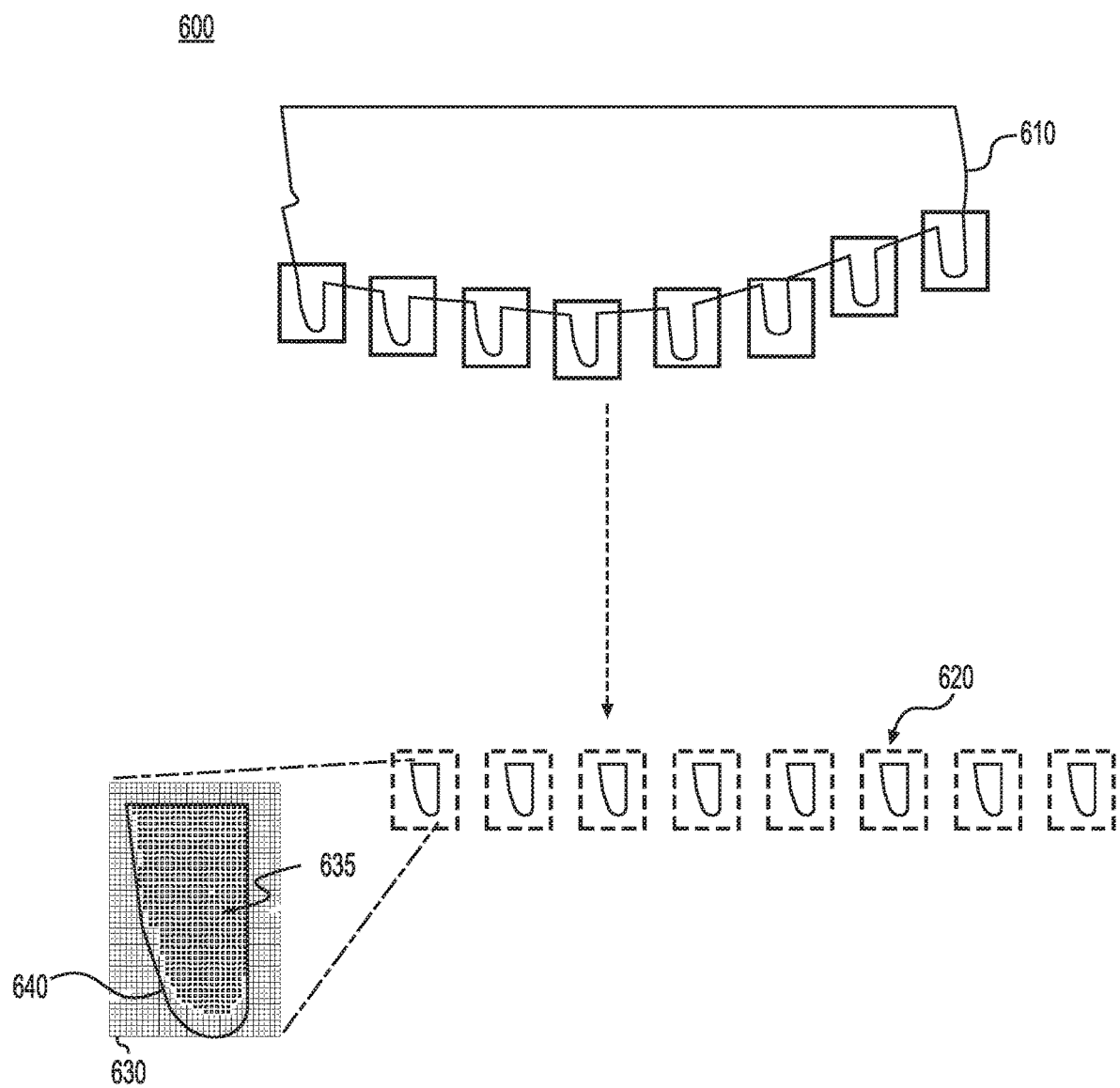
FIG. 6 is a data flow diagram depicting an example flow of data for a GET identification and pixel count process.

FIG. 6 depicts a pixel count data flow diagram 600. Pixel count data flow diagram 600 represents an example data flow that may occur within image analyzer 170 to determine pixel counts associated with teeth 125. While example data flow diagram 600 refers to teeth 125, other GET are contemplated in different embodiments. In some embodiments, image analyzer 170 performs a computer vision segmentation analysis on selected image 540 to separate captured bucket-tool image 610 from the background of selected image 540. Once bucket-tool image 610 has been segmented from the background, image analyzer 170 can identify a plurality of tooth images 620 associated with captured bucket-tool image 610, and by extension, selected image 540. Image analyzer 170 can use several techniques for identifying the plurality of tooth images 620. For example, as described above, image analyzer 170 can use template tooth locations 527 to determine approximate corresponding image tooth locations 547, and then extract a pixel region 630 of predetermined size that is likely to contain an image of an individual tooth. For example, pixel region 630 may be fifty pixels high by thirty pixels wide and image analyzer 170 may extract pixel region 630 for each of corresponding image tooth locations 547.

In some embodiments, image analyzer 170 may employ additional template matching, segmentation, convolution filter, or other computer vision techniques to segment the plurality of tooth images 620 from captured bucket-tool image 610. For example, image analyzer 170 may employ a template of one tooth to identify the plurality tooth images 620.

According to some embodiments, image analyzer 170 may determine a pixel count associated with the plurality of tooth images 620. In some embodiments, image analyzer 170 may detect pixels 635 associated with a tooth from selected image 540. For example, image analyzer 170 may determine that pixels 635 contains four hundred thirty-six pixels. Pixels 635 can provide a visual representation or abstraction of the actual size and dimension of one of teeth 125 of work machine 100 from which wear analyzer can determine wear. Image analyzer 170 can communicate the pixel count to wear analyzer 175 for further analysis.

Image analyzer 170 can also determine an expected amount (e.g., an expected number, an expected location, an expected grouping, etc.) of pixels associated with each tooth based on the number of pixels representing template teeth 525 in bucket-tool template 510. For example, image analyzer can use computer vision techniques, such as edge detection for example, to detect an expected edge 640 of an unworn tooth based on edges of template teeth 525. The number of pixels within expected edge 640 may represent an expected pixel count for pixels 635. In some embodiments, wear analyzer 175 can use the expected pixel count and the actual number of pixels 635 to determine wear level of teeth at a particular point in time.

In some embodiments, wear analyzer 175 can calculate a similarity score between template teeth 525 (which represent unworn tools) and the plurality of tooth images 620 as described above. The similarity score can be calculated based on the difference between expected pixel counts for teeth 125 and number of actual pixels 635. In some embodiments, a convolution filter can be used to create similarity scores based on comparing template 510 with selected image 540, or portions of template 510 (e.g. template teeth 525) with corresponding portions of selected image 540. In one example, the similarity score can be normalized to a scale of zero to one-hundred, with values below twenty representing low similarity (e.g., a tooth may be missing or broken), values above eighty representing generally unworn tools, and values between twenty and eighty representing varying degrees of wear. While similarity scores may be scaled on a range of zero to one-hundred, other ranges are contemplated within the spirit and scope of the disclosed embodiments.

Figure 7:
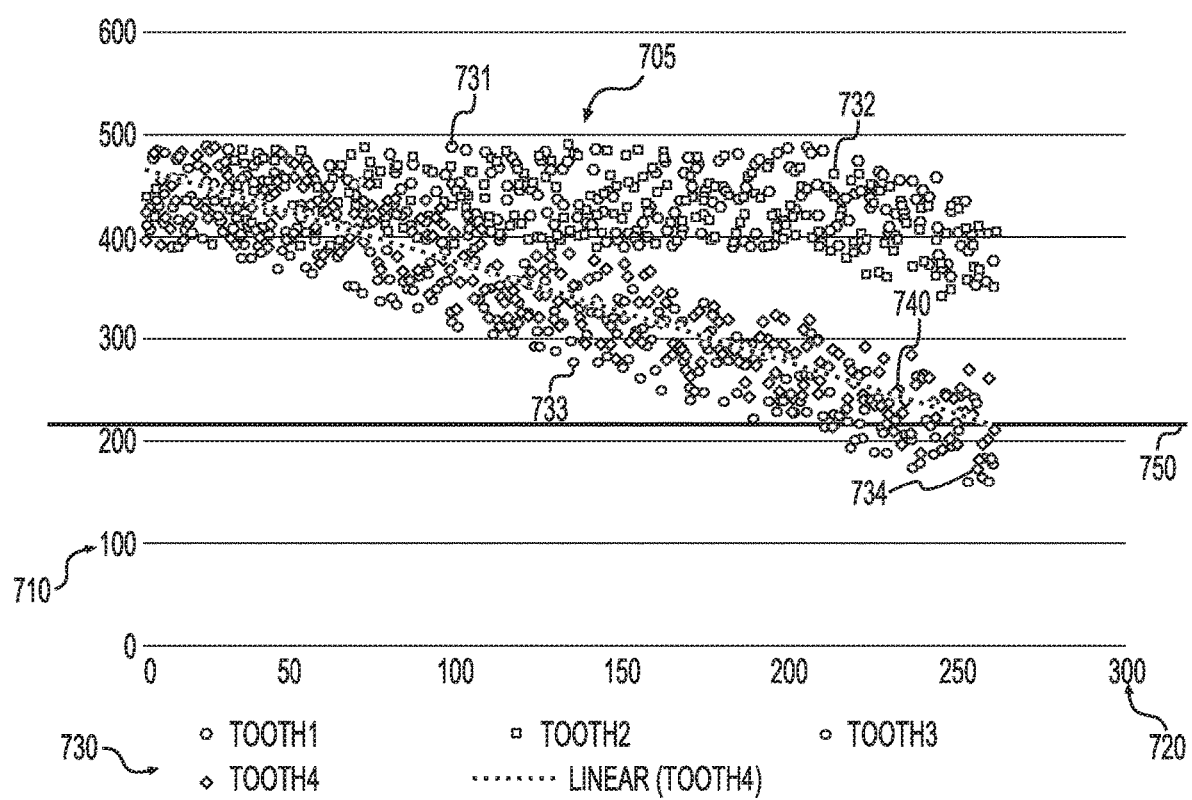
FIG. 7 is a diagram of an example mapping of GET pixel counts to time instances in an example embodiment.

FIG. 7 is a diagram of an example wear trend graph 700 showing a mapping of tool pixel counts over time, represented as plots 705. Wear trend graph 700 can be created by wear analyzer 175 according to some embodiments. Wear trend graph 700 can include pixel count axis 710 and time axis 720. While wear trend graph 700 shows pixel count axis 710 as the vertical axis and time axis 720 as the horizontal axis, these axes can be reversed in some embodiments. Pixel count axis 710 can be incremented by number of pixels. Time axis 720 can be incremented by any period of time such as minutes, hours, or days for example. In some embodiments, wear analyzer 175 provides code to operator control panel that causes display 133 to render a graphical representation of wear trend graph 700.

While example wear trend graph 700 is shown visually in FIG. 7, wear analyzer 175 need not create code for rendering a visual graph. For such embodiments, the data shown in wear trend graph 700 can be stored in a data structure or object that wear analyzer 175 uses to determine wear trends, wear levels, and/or loss of teeth 125. For such embodiments, wear trend graph 700 is a visual aid provided for discussion purposes in the present disclosure.

As shown in the example of FIG. 7, wear trend graph 700 shows plots 705 for four types of teeth: tooth1 731, tooth2 732, tooth3 737, and tooth4 734. In rendered visual representations of wear trend graph 700, wear trend graph 700 can include tooth key 730, which identifies the correlation between plots on wear trend graph 700 and tooth1 731, tooth2 732, tooth3 737, and tooth4 734. While wear trend graph 700 shows data related to teeth, it may show plots related to other types of GET in some embodiments.

According to some embodiments, wear analyzer 175 can determine a wear trend based on plots 705. For example, FIG. 7 shows wear trend 740 for plots 705 of tooth4 734. In the example wear trend graph 700, wear trend 740 is linear, but some teeth may have a non-linear wear trend in certain applications. Wear trend graph 700 can also include wear level threshold 750. When wear trend 740 intersects with wear level threshold 750, the tooth corresponding to wear trend 740 (e.g., tooth4 734) has worn to the point of needing replacement or has broken indicating tooth loss. In some embodiments, alert manager 180 may generate a visual or audio alert informing operator of work machine 100 that a tooth needs replacement. In some embodiments, wear trend 740 can be used to detect a future point in time when a tooth may need replacement based on the intersection between an extrapolated version of wear trend 740 and wear threshold 750.

Figure 8:
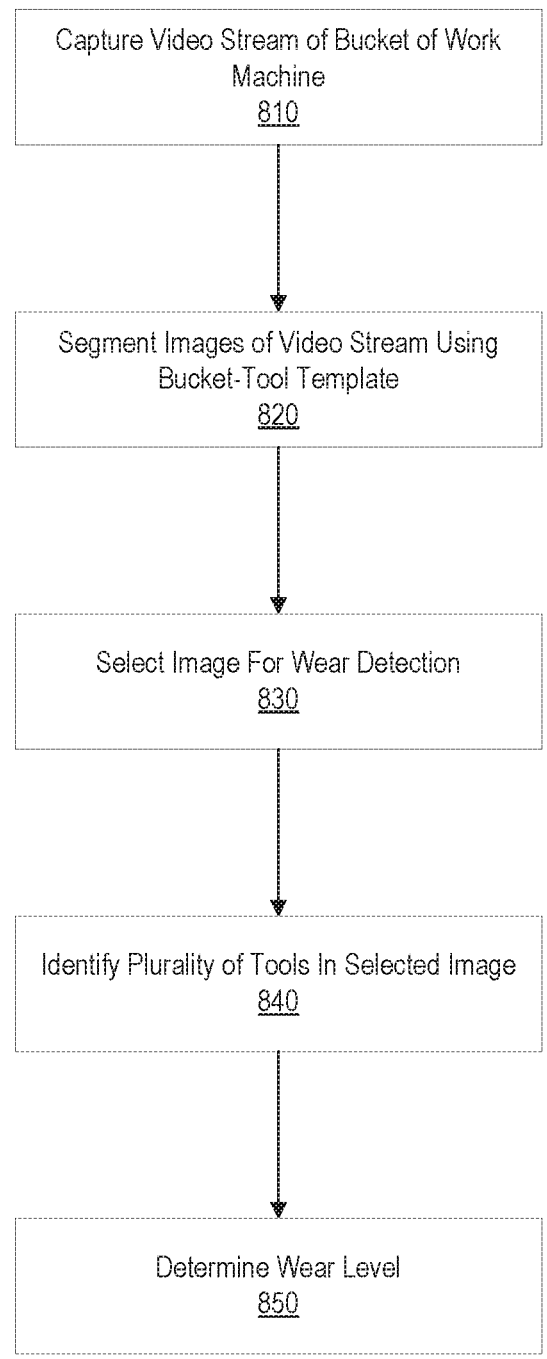
FIG. 8 is an example process for detecting wear in an example environment.

FIG. 8 shows a flowchart representing an example image selection process 800. In some embodiments, process 800 can be performed by image selector 165 and image analyzer 170. Although the following discussion describes process 800 as being performed by image selector 165 and image analyzer 170, other components of wear detection computer system may perform one or more blocks of process 800 without departing from the spirit and scope of the present disclosure.

Process 800 begins at block 810 where the image selector captures a video stream of a bucket of the work machine. The video stream can include a plurality of images of the bucket of the work machine, and the bucket's ground engaging tools (GET) (e.g., teeth). At block 820, image selector 165 segments the plurality of images from the video stream using a bucket-tool template. The bucket-tool template, consistent with the above discussion, includes an image of a bucket with unworn GET. The image selector can perform block 820 using a segmentation analysis where images of the bucket and tooth from the plurality of images of the video feed are segmented from the background. In addition, the bucket-tool template can act as a mask that is applied to the plurality of images to determine similarity between the plurality of images and the bucket-tool template. In some embodiments, the image selector determines a similarity score between the bucket-tool template and the plurality of images. Based on the similarity, image selector 165 may select an image for wear detection analysis at block 830.

At block 840, an image analyzer identifies a plurality of GET in the image selected at block 830. In some embodiments, the image analyzer can identify the plurality of GET using locations of tools within the bucket-tool template, as described above with respect to FIG. 5. Once the plurality of GET have been identified, the wear level for the tools can be determined. Wear level can be determined based on differences between the pixel counts of unworn tools depicted in the bucket-tool template and the pixel counts associated with the plurality of GET. As another example, block 850 can be performed by comparing the similarity of tools within the bucket-tool template to the plurality of identified GET. As another example, wear levels can be determined consistent with wear detection analysis process 900 shown in FIG. 9.

Figure 9:
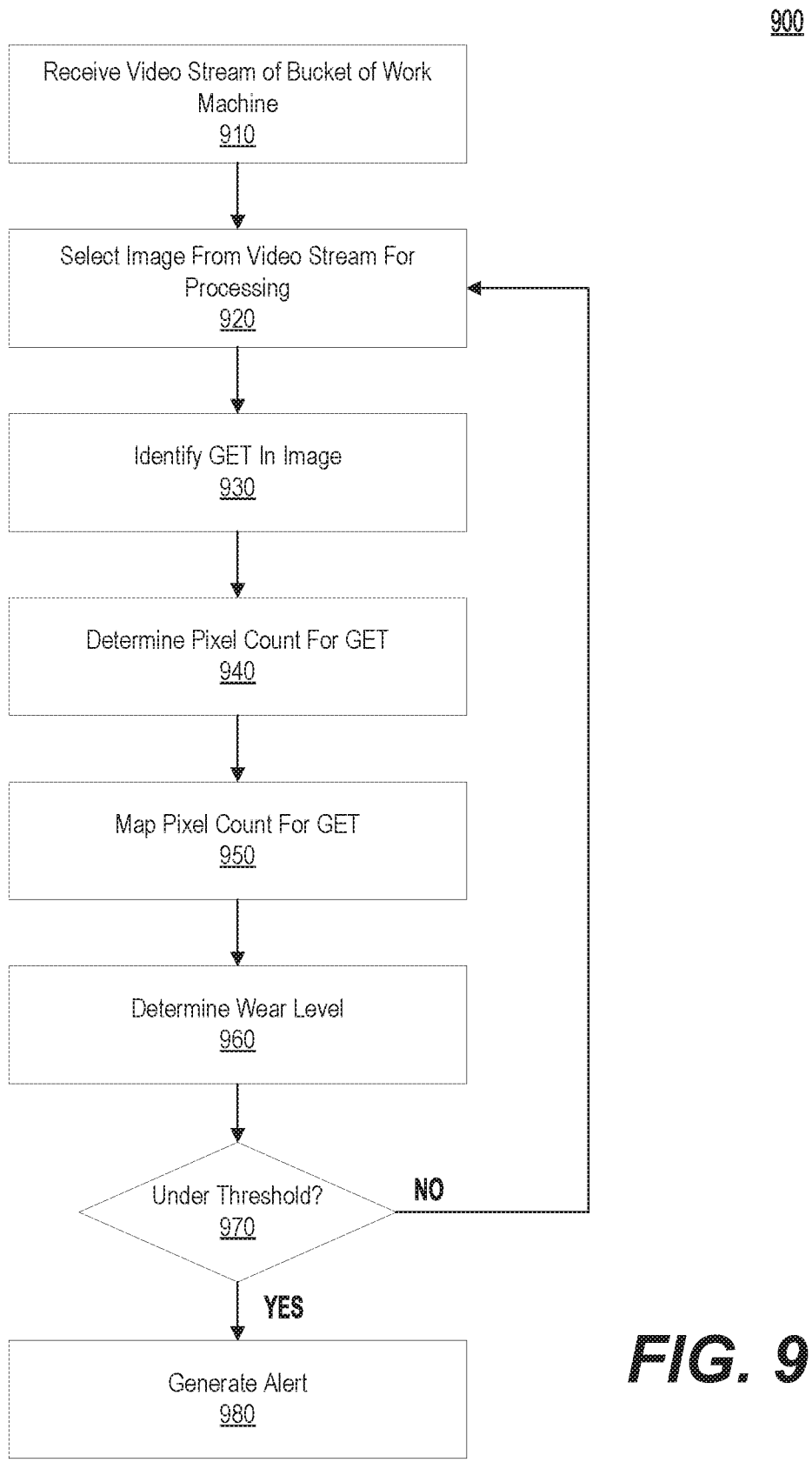
FIG. 9 is an example process for image selection for performing wear-detection analysis in an example environment.

FIG. 9 shows a flowchart representing an example wear detection analysis process 900. In some embodiments, process 900 can be performed by one or more components of wear detection computer system 110. Although the following discussion describes process 900 as being performed by certain components of wear detection computer system 110, different components of wear detection computer system may perform one or more blocks of process 900 without departing from the spirit and scope of the present disclosure.

Process 900 begins at block 910 where the image selector receives a video stream of a bucket of the work machine. The video stream can include a plurality of images of the bucket of the work machine, and the bucket's ground engaging tools (GET). At block 920, the image selector selects an image from the video stream for further wear detection processing. In some examples, the image selector performs block 920 using a bucket-tool template as described above with respect to image selection process 800. In some embodiments, image selector 165 selects images based on the position of the work machine's bucket in the dig-dump cycle. For example, the image selector can capture an image of the video stream when the bucket is in an optimal position for the camera to capture an image of the bucket and its GET. In other examples, the image selector can use machine learning techniques or neural networks to identify optimal images for wear detection analysis. One or more of the above techniques may be combined to select images at block 920.

At block 930, an image analyzer identifies GET within the selected image. The image analyzer can detect GET consistent with the embodiments disclosed above with respect to FIGS. 6 and 8. Once the image analyzer identifies the GET, the image analyzer determines pixel counts for the GET at block 940. The pixel counts are provided to a wear analyzer in some example. The wear analyzer maps the pixel counts for the GET to an instance in time at block 950. The instance in time can be an absolute date-time value (e.g., Oct. 1, 2020 16:04:32) or it could be a relative time based on the operation of the work machine (e.g., number of seconds, minutes, hours of work machine operation).

At block 960, the wear analyzer determines the wear level for the GET based on current pixel-time mappings and previous pixel-time mappings. Wear analyzer 175 can determine a wear level by creating a line of best fit or curve of best fit for the pixel-time mappings. If the wear level is above a wear threshold value (block 970: YES) processing returns to block 920. If the wear level under a wear threshold value (block 970: NO), alert manager 180 may generate an alert that one or more of the GET need replacement. In some embodiments, after the alert is generated, processing returns to block 920.

Throughout the above description, certain components of wear detection computer system 110 were described to perform certain operations. But, in some embodiments of wear detection computer system 110, other components may perform these operations other than what is described above. In addition, wear detection computer system 110 may include additional or fewer components than what is presented above in example embodiments. Those of skill in the art will appreciate that wear detection computer system 110 need not be limited to the specific embodiments disclosed above.

INDUSTRIAL APPLICABILITY

The systems and methods described herein can be used in association with operation of work machines at a worksite that are excavating, moving, shaping, contouring, and/or removing material such as soil, rock, minerals, or the like. These work machines can be equipped with a bucket used to scoop, dig, or dump the material while at the worksite. The bucket can be equipped with a series of ground engaging tools (GET) to assist with the loosening of the material during operation. The work machines can also include a system having a processor and memory configured to perform methods of wear detection according to the examples described herein. The system and methods can detect wear of work machine components such as GET. In some examples, the system and methods can capture, from a camera associated with the work machine, video of the work machine component for wear detection processing. In some examples, the system and methods select images from the video captured by the camera for processing using an image template that is compared to the video images. The template can include a sample image of a bucket with unworn GET associated with the work machine. Use of a bucket-tool template, as opposed to a template of a single unworn tooth, can decrease the resources required for image selection processing. Since a bucket-tool template is larger than a template having only one GET, it will take fewer processing cycles to compare the template to the captured images. Use of a bucket-tool template can also increase accuracy of image selection and reduce false positives. Since clumps of dirt, debris, or rock fragments at the worksite can be similar in size and shape to a single tooth, traditional wear detection systems using a single-tooth template can mistake such materials for GET causing processing errors or false positives. Thus, use of a bucket-tool template can decrease errors in processing over a computer vision system or method using single-tooth templates.

In some examples, the system and methods select images for wear detection by identifying individual GET and comparing the pixel counts for the GET in the selected image to an expected pixel count for the GET based on the bucket-tool template. In some examples, the system and methods can identify individual GET based on the location of the unworn GET in the bucket-tool template—it can leverage the approximate location of the GET relative to the bucket in the selected image based on the known location of GET in the bucket-tool template, and standard computer vision techniques (e.g., a convolutional filter) can be employed to identify the specific GET within the selected image. By narrowing the focus of the standard computer vision techniques to the approximate location of the GET in the selected image, processing time is reduced.

In some examples, the system and methods determine wear detection by capturing images of the GET over a period of time. For example, the system and method can capture multiple images of a GET, at multiple instances of time, over the period of time. The system and methods can determine, using the example embodiments disclosed herein, a pixel count for the GET at the multiple instance of time. The pixel counts can be mapped to the instance of time, and the system and method can determine a wear trend based on the rate of change in the pixel count. The system and method can predict when GET need replacement based on the wear trend. By using pixel counts of GET over time, the system and methods can reduce errors in wear detection by minimizing the impact of false positives as such false positives are outliers to the wear trend and represent statistical noise to the wear trend. In addition, the disclosed system and methods require less processing resources than machine learning or neural networks techniques for determining wear of machine components. Thus, the disclosed system and methods are more efficient than wear detection systems that rely on machine learning or neural network techniques for identifying wear using computer vision techniques as they are more accurate and require less processing resources.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. A method comprising:
receiving from a camera associated with a work machine, a video stream including a plurality of images of a bucket of the work machine, the bucket having a model number and at least one ground engaging tool (GET);
based on the model number, selecting:
a matching bucket-tool template corresponding to the bucket from a plurality of bucket-tool templates stored in a template library of the work machine,
a predetermined moment in a dig-dump cycle of the work machine, and
a predetermined position of the bucket during the predetermined moment in the dig-dump cycle;
identifying a plurality of tool images from the video stream over a period of time that matches one or more stored images from the matching bucket-tool template, the plurality of tool images capturing the bucket at the predetermined position during the predetermined moment in the dig-dump cycle and depicting the at least one GET at a plurality of time instances over the period of time;
determining a plurality of tool pixel counts from the plurality of tool images based at least in part on a shape and style of the GET, the plurality of tool pixel counts indicating at least one of:
an area of the GET,
a height of the GET,
a width of the GET, or
a sum of the height and the width of the GET; and
determining a wear level or loss for the at least one GET based on the plurality of tool pixel counts.

2. The method of claim 1 further including:
generating an alert based on the wear level or loss including the wear level reaching a wear threshold value; and
displaying the alert on a display of an operator control panel of the work machine, the alert including at least one of:
the at least GET being lost,
the at least GET requiring a replacement, or
a replacement time for the at least GET.

3. The method of claim 1 wherein determining the wear level or loss for the at least one GET based on the plurality of tool pixel counts comprises mapping the plurality of time instances over the period of time to the plurality of tool pixel counts.

4. The method of claim 1 further comprising determining a wear-level trend.

5. The method of claim 4 further comprising predicting a replacement time for the at least one GET based on the wear-level trend.

6. The method of claim 4 wherein the wear-level trend is determined by mapping the plurality of time instances to the plurality of tool pixel counts.

7. The method of claim 1 wherein identifying the plurality of tool images from the video stream over the period of time includes:
performing a segmentation analysis on the plurality of tool images, and
finding one or more images from the plurality of tool images that match the one or more stored images.

8. The method of claim 1 wherein identifying the plurality of tool images from the video stream comprises selecting a plurality of video frames from the video stream based on a segmentation analysis applied to the video stream.

9. The method of claim 1, wherein:
the predetermined moment in the dig-dump cycle includes:
a dig end of the dig-dump cycle,
a midpoint in the dig-dump cycle, or
a dump end of the dig-dump cycle; and
the predetermined position of the bucket during the predetermined moment includes:
the bucket at rest at the dig end of the dig-dump cycle,
the bucket within a range of positions at the midpoint in the dig-dump cycle, or
the bucket at rest at the dump end of the dig-dump cycle.

10. A system comprising:
a camera;
a processor; and
a non-transitory computer readable medium storing executable instructions that, when executed by the processor, cause the processor to perform operations, the operations comprising:
receiving, from the camera, a video stream including a plurality of images of a bucket of a work machine, the bucket having a model number and at least one ground engaging tool (GET);
based on the model number, selecting:
a matching bucket-tool template corresponding to the bucket from a plurality of bucket-tool templates stored in a template library of the non-transitory computer readable medium,
a predetermined moment in a dig-dump cycle of the work machine, and
a predetermined position of the bucket during the predetermined moment in the dig-dump cycle;
identifying a plurality of tool images from the video stream that matches one or more stored images from the matching bucket-tool template, the plurality of tool images capturing the bucket at the predetermined position during the predetermined moment in the dig-dump cycle and depicting the GET at a plurality of time instances over a period of time;
determining a plurality of tool pixel counts from the plurality of tool images based at least in part on a shape and style of the GET, the plurality of tool pixel counts indicating at least one of:
an area of the GET,
a height of the GET,
a width of the GET, or
a sum of the height and the width of the GET; and
determining a wear level or loss for the at least one GET based on the plurality of tool pixel counts.

11. The system of claim 10 wherein the operations further comprise generating an alert based on the wear level or loss.

12. The system of claim 10 wherein determining the wear level or loss for the at least one GET based on the plurality of tool pixel counts comprises mapping the plurality of time instances over the period of time to the plurality of tool pixel counts.

13. The system of claim 10 wherein the operations further comprise determining a wear-level trend.

14. The system of claim 13 wherein the operations further comprise predicting a replacement time for the at least one GET based on the wear-level trend.

15. The system of claim 13 wherein the wear-level trend is determined by mapping the plurality of time instances to the plurality of tool pixel counts.

16. The system of claim 10 wherein identifying the plurality of tool images from the video stream over the period of time includes:
performing a segmentation analysis on the plurality of tool images, and
finding one or more images from the plurality of tool images that match the one or more stored images.

17. The system of claim 10 wherein identifying the plurality of tool images includes:
calculating a similarity score for the plurality of tool images and the one or more stored images, wherein the similarity score reflects a measure of the plurality of tool images matching the one or more stored images.

18. The system of claim 10 wherein identifying the plurality of tool images includes:
calculating a similarity score for the plurality of tool images, wherein the similarity score indicates the wear level of the plurality of tool images.

19. A system comprising:
a camera configured to capture a video stream of a bucket having a model number and a plurality of ground engaging tools (GET) during a moment in a dig-dump cycle of a work machine when the plurality of GET is within a field of view of the camera;
a processor; and
a computer readable medium storing executable instructions that, when executed by the processor, cause the processor to perform operations, the operations comprising:
receiving the video stream from the camera, the video stream including a plurality of images of the bucket;
based on the model number, selecting:
a matching bucket-tool template corresponding to the bucket from a plurality of bucket-tool templates stored in a template library of the work machine,
a predetermined moment in the dig-dump cycle of the work machine, and
a predetermined position of the bucket during the predetermined moment in the dig-dump cycle;
identifying a plurality of tool images from the video stream that match one or more stored images from the matching bucket-tool template, the plurality of tool images capturing the bucket at the predetermined position during the predetermined moment in the dig-dump cycle and depicting, at a plurality of time instances over a period of time, at least one of the plurality of GET;

determining a plurality of tool pixel counts associated with the at least one of the plurality of GET from the plurality of tool images based at least in part on a shape and style of the at least one of the plurality of GET, the plurality of tool pixel counts indicating at least one of:

an area of the at least one of the plurality of GET,
a height of the at least one of the plurality of GET,
a width of the at least one of the plurality of GET, or
a sum of the height and the width of the at least one of the plurality of GET; and determining a wear level or loss for the at least one of the plurality of GET based on mapping the plurality of time instances to the plurality of tool pixel counts.

20. The system of claim 19 wherein the operations further comprise:

determining a wear-level trend based on the mapping;
predicting a replacement time for the at least one of the plurality of GET based on the wear-level trend;
generating an alert based on the wear level or loss; and
displaying the alert on a display of an operator control panel of the work machine, the alert including at least one of:
the at least one of the plurality of GET being lost,
the at least one of the plurality of GET requiring a replacement, or
a replacement time for the at least one of the plurality of GET.

* * * * *